United States Patent [19]

Schmitz et al.

[11] Patent Number: 4,774,669

[45] Date of Patent: Sep. 27, 1988

[54] TRAIN CONTROL HAVING A SUPERVISORY MONITOR PROVIDING IMPROVED OPERATING SAFETY AND BETTER MAINTENANCE SUPPORT

[75] Inventors: William E. Schmitz, Wilkinsburg; Fred J. Dimasi, Library, both of Pa.

[73] Assignee: Westinghouse Electric Corp., Pittsburgh, Pa.

[21] Appl. No.: 876,157

[22] Filed: Jun. 19, 1986

[51] Int. Cl.⁴ .................. G06F 11/00; G06F 3/02
[52] U.S. Cl. ..................... 364/436; 364/550; 246/5
[58] Field of Search ............ 364/426, 436, 424, 550, 364/551; 246/28 F, 5, 182 R, 182 C, 4, 169 R; 340/52 R, 52 F, 47

[56] References Cited

U.S. PATENT DOCUMENTS

| | | | |
|---|---|---|---|
| 4,041,470 | 8/1977 | Slane et al. ................. | 364/424 X |
| 4,181,943 | 1/1980 | Mercer, Sr. et al. ............... | 364/426 |
| 4,247,897 | 1/1981 | McDonald et al. ............... | 364/436 |
| 4,307,455 | 12/1981 | Juhasz et al. ..................... | 364/900 |
| 4,398,258 | 8/1983 | Naitoh et al. ..................... | 364/551 |
| 4,561,057 | 12/1985 | Haley, Jr. et al. ................. | 364/436 |
| 4,656,586 | 4/1987 | Ochiai et al. ..................... | 364/424 |

Primary Examiner—Parshotam S. Lall
Assistant Examiner—Thomas G. Black
Attorney, Agent, or Firm—E. F. Possessky

[57] ABSTRACT

A train control and monitoring system detects operating errors in controlled devices in each car and disables a car propulsion system if an error is detected. Operator reset is employed to reactivate a car, but operator reset control is disabled if a limit error count is reached and in that event only a supervisor reset can reactivate the car. When a car performs with good behavior through a power/brake cycle, the error count is decremented by one count.

25 Claims, 9 Drawing Sheets

TRAIN CONTROL HAVING A SUPERVISORY MONITOR PROVIDING IMPROVED OPERATING SAFETY AND BETTER MAINTENANCE SUPPORT

BACKGROUND OF THE INVENTION

The present invention relates to train controls and more particularly to supervisory monitor and control systems for trains having individually driven traction motor cars.

In the operation of trains having individually driven cars such as those in the city of New York, major faults or operating errors can occur in a car during train operation and the car may be deenergized with its load share transferred to the remaining cars. Occasionally, a second and possibly a third car may be deenergized as a result of a fault or operating error but it would be extremely rare for more than two or three cars to be disabled at the same time.

A train can normally be operated without noticeable reduction in performance with a single idle car, but an operator may notice reduced performance with two cars idled. In any case, the operator may reset an idled car once the car disablement becomes known. Upon repowering, the car may continue to operate or it may again be disabled if the operating fault or error recurs. The fact that the car may sustain power operation only means that the set of circumstances which led to the previous disablement does not now exist. There may or may not be a need for car maintenance and there may or may not be an impact on safety.

Within a transit system, a number of operators will experience over time a variety of operating faults and errors in a number of cars. The totality of this actual data has a significant bearing on maintenance needs and may have an impact on safety. Subsequent actions taken by operators and supervisory personnel individually or collectively over time may or may not be supportive to maintenance and safety needs. It is therefore desirable that a train control system be structured and operated to reflect ongoing car operating faults and errors so as to provide simultaneously (1) reliable scheduled train operation without unnecessary outages and (2) enhanced safety and car maintenance support.

SUMMARY OF THE INVENTION

A control and monitoring system is provided for a train having a plurality of cars each having a propulsion system. The control includes a microcomputer which responds to a plurality of input signals and generates control outputs for operating controlled devices in the associated car propulsion system. The computer is operated to detect errors between commanded and actual operating conditions for preselected controlled devices or system parameters and to deactivate the associated propulsion system for any car in which a discrepancy has been detected. All of the controlled devices are put in a safe condition and any trainline signals normally used to control the propulsion system are ignored.

The operator may reset any deactivated propulsion control to reactivate the associated car propulsion system. The operator resetting control for the deactivated propulsion control is disabled under predetermined error conditions. A supervisor control resets any deactivated propulsion control to reactivate the associated car propulsion system where the operator resetting control means has been disabled for that system. Good behavior of a car is employed to modify the conditions under which lockout of operator reset occurs.

DESCRIPTION OF THE PREFERRED EMBODIMENT

Figure 1:
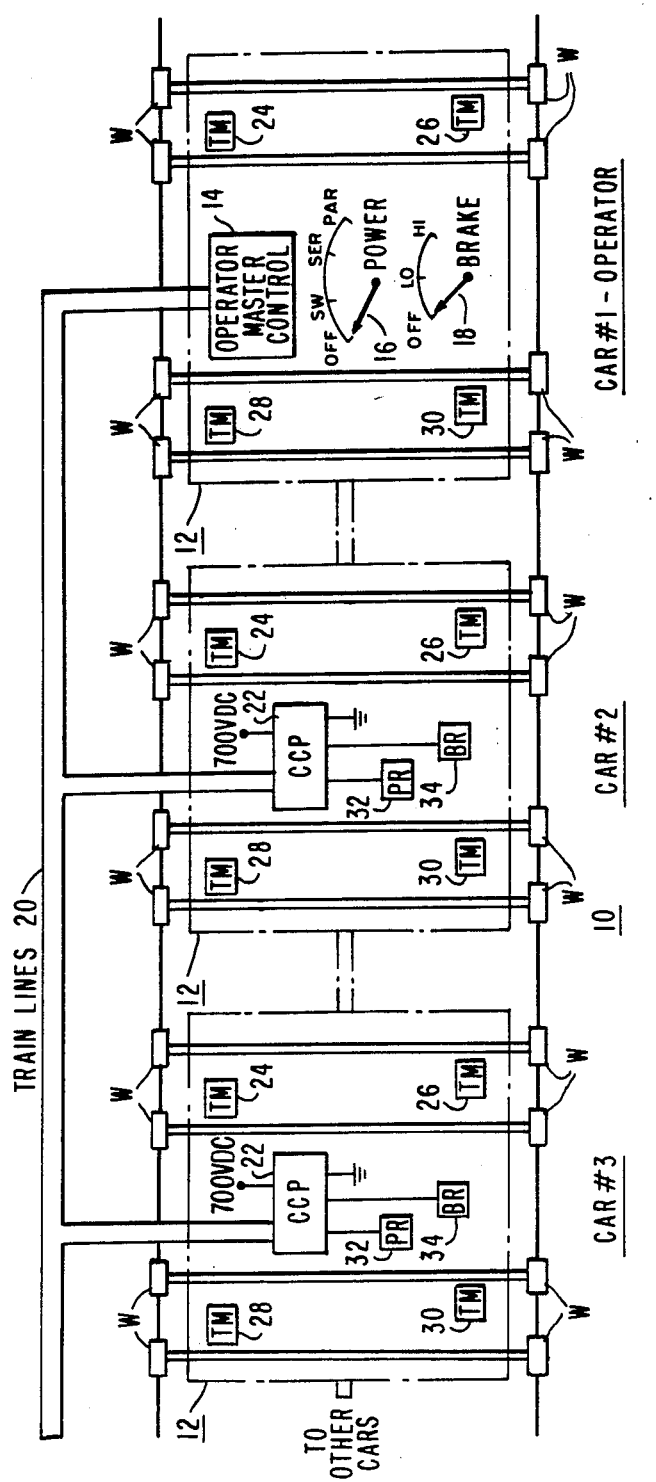
FIG. 1 shows a schematic diagram of a train having traction motor driven cars controlled and monitored in accordance with the invention.

More particularly, there is shown in FIG. 1 a train 10 having a plurality of individually driven cars 12 with car #1 being designated as the operator car and having a master controller 14. Generally, the master controller has a power switch 16 and a brake switch 18 with the designated settings. Master control signals are passed over train lines 20 which are interconnected with car control packages 22 in the individual cars 12.

As shown for cars #2 and #3, each car 12 has a pair of DC traction motors 24 and 26 associated with its four front wheels W and a pair of DC traction motors 28 and 30 associated with its four rear wheels W. The traction motors are powered from a 600 V DC power supply under the control of the car control package 22. Power resistors 32 and brake resistors 34 are switched to control motor drive current and motor braking current. A typical train may have ten cars 12 coupled together.

CONTROL HARDWARE

Figure 2:
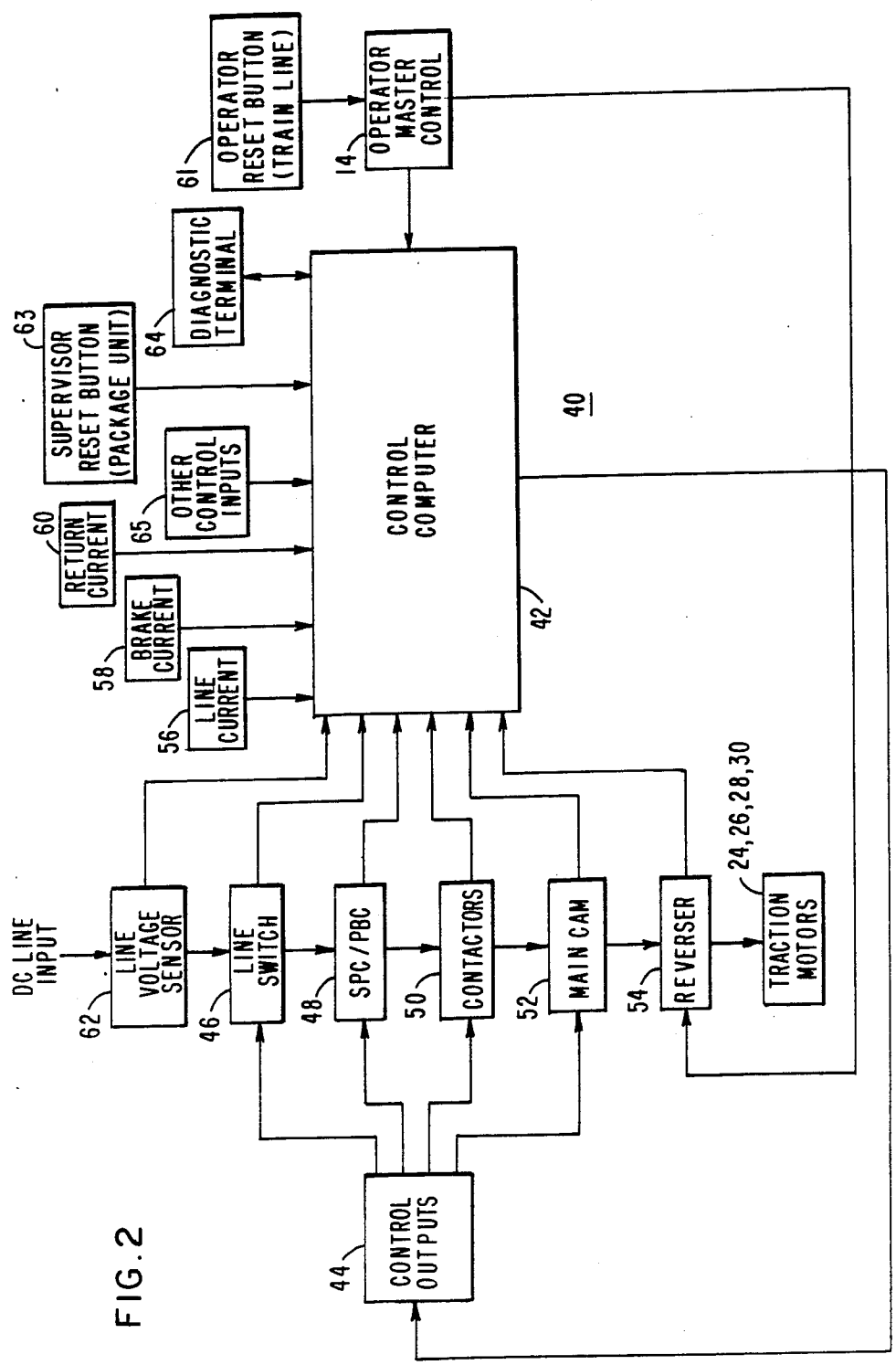
FIG. 2 shows a schematic diagram of a microcomputer based control for each car in the train of FIG. 1.

In FIG. 2, there is shown a control system 40 which is part of an advanced electric cam propulsion system manufactured by the assignee of the present patent application. Overall, the advanced electric cam propulsion system is structured to increase the accuracy, response and flexibility of the logic system. A small number of solid state devices replace many high maintenance electromechanical interlocks and relays. A new, brushless electric motor design increases accuracy in cam positioning. It is suitable for service in new and rebuilt heavy and light rail transit cars. It is compatible with other propulsion systems and can operate in mixed propulsion system trains.

The control 40 employs a microcomputer 42 to develop control outputs 44 for application as shown to a line switch 46, a series-parallel controller/power braking controller 48 (operated by a brushless stepper motor), contactors 50 and a main cam control 52, reverser 54 is operated by the master controller 14 to set the direction of operation for the train. A more complete list of outputs follows:

| Outputs: | |
| --- | --- |
| main cam stepper motor | J contactor |
| series-parallel/power brake | overload reset coil |
| controller stepper motor | on line switch |
| line switch enable | malfunction indication light |
| S1 contactor | diagnostic terminal |
| S2 contactor | |

Various inputs are applied to the microcomputer 42. Line, brake, and return currents are sensed and applied as computer inputs as indicated by boxes 56, 58, and 60. Line voltage is detected as indicated by box 62. Status signals include those for the controllers 48, the contactors 50, the line switch 46, the main cam 52 and the reverser 54.

An operator reset button 61 is operated at the master controller 14 to reset an error disabled (inhibited) car control to an operational state unless operator reset has been disabled. A supervisor reset button 63 located in the car control package 22 (FIG. 1) can be operated by a maintenance technician to restore a deenergized car to the operational state if operator reset has been inhibited.

Other status and control inputs 65 are provided but not detailed in FIG. 2. A more complete list of inputs follows:

| Inputs: | |
| --- | --- |
| train line signals | overload relay |
| line current | line voltage sensor |
| brake current | reverser confirmed direction relay |
| return current | S1 contactor position |
| brake request pressure | S2 contactor position |
| load weigh | J contactor position |
| car battery voltage | emergency relay |
| line switch position | diagnostic terminal 64 |

PROPULSION CONTROL SOFTWARE ORGANIZATION

Figure 3:
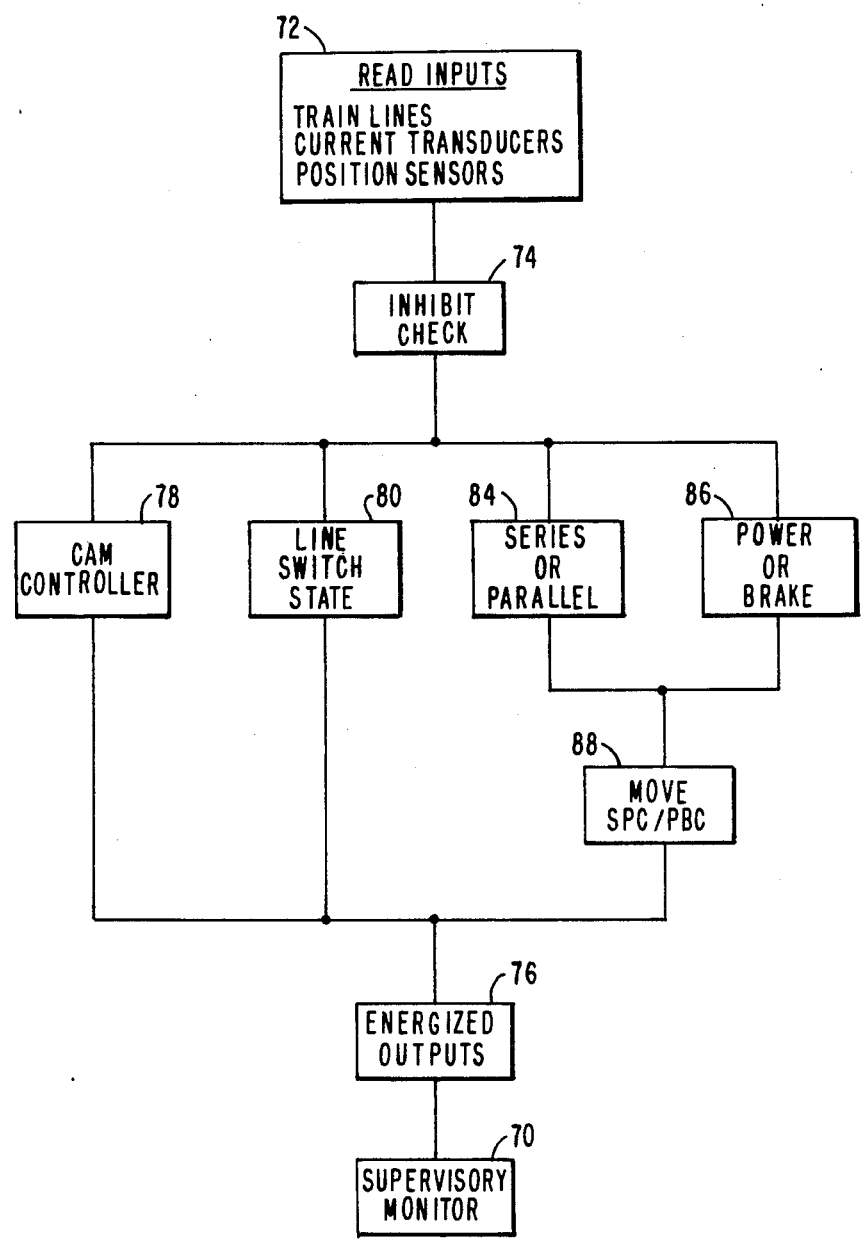
FIG. 3 shows an organization chart for the control programs employed to operate the microcomputer of FIG. 2.

Programming for the computer 42 includes control programs for the cam propulsion system and a supervisory monitor 70 as shown by the mixed flow and organization chart in FIG. 3. Inputs are read as indicated by box 72 to provide data for the various programs which generate control and monitor outputs. An inhibit check box 74 detects whether control action is to be inhibited as directed by the supervisory monitor 70, and if so no control outputs are generated.

Normally, control is permitted and in that case the following programs are executed to determine what outputs are to be energized as indicated by box 76:
ADVANCE CAM CONTROLLER TO MAINTAIN REQUESTED MOTOR CURRENT—78
DETERMINE DESIRED LINE SWITCH STATE—80
DETERMINE DESIRED CONTACTOR STATE—82
DETERMINE SERIES OR PARALLEL REQUEST—84
DETERMINE POWER OR BRAKE REQUEST—86
MOVE SPC/PBC TO REQUESTED POSITION—88
For a more complete description of a microprocessor based train car control which in basic configuration is like the one described herein, reference is made to U.S. Pat. No. 4,458,185 assigned to the present assignee. For some additional system description, reference is made to Appendix A herein.

SUPERVISORY MONITOR SYSTEM

Figure 4:
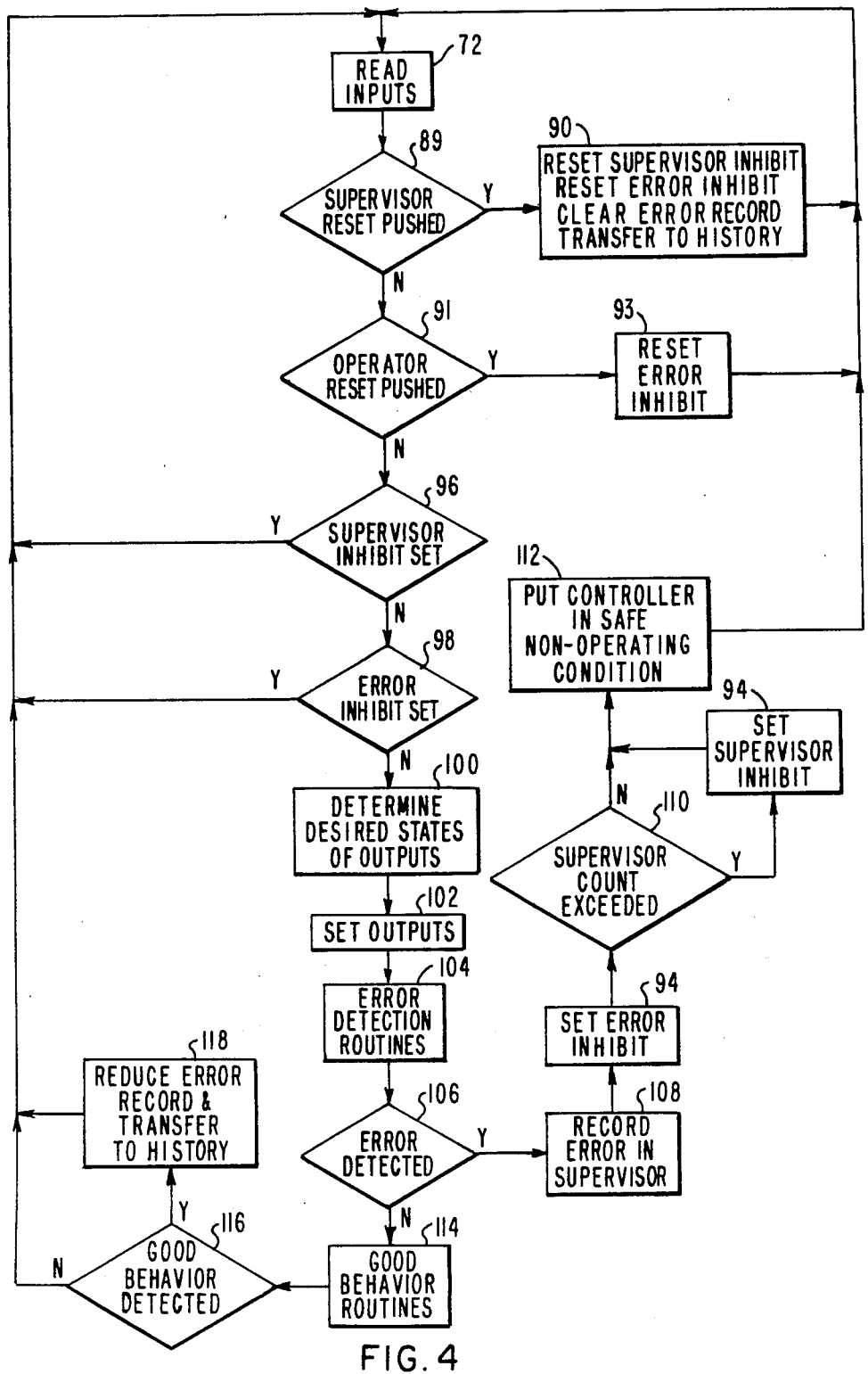
FIG. 4 shows a flow chart for a supervisory monitor program included in the program arrangement of FIG. 3.

The operation of the program system to provide computer control and monitoring of the car cam propulsion system is illustrated in greater detail by the flow chart shown in FIG. 4. After inputs are read by block 72, block 89 detects whether supervisory reset has occurred and if so block 90 clears inhibits on control operation, i.e. an error inhibit set in box 92 when an error is detected and a supervisor inhibit set in box 94 when a supervisory error count is exceeded, and the program cycles back to the entry.

If no supervisory reset is detected, block 91 determines whether an operator reset has been generated, i.e. where the supervisory limit on the error count has not been exceeded. If an operator reset has occurred, block 93 rests the error inhibit and the program cycles back to the beginning.

When the supervisor inhibit is set because the operator can no longer reset the error inhibit and no supervisor reset has occurred, box 96 places the program in an idle looping operation and disables active computer control. Similarly, if an error inhibit has been set and no operator reset has occurred, box 98 causes idle looping operation with a disabling of computer control.

If inhibit checks indicate that there are no inhibits, block 100 determines control and any other outputs and block 102 registers the determined output states. The functions performed by blocks 76 through 88 in FIG. 3 are embraced by the functioning of the blocks 100 and 102 in FIG. 4.

Next, box 104 detects whether failures or errors have occurred in the operation of predetermined controlled devices. Preferably, error detection generally is based on a comparison of commanded and actual states for the predetermined controlled devices or controlled propulsion system parameters (currents in this case).

When box 106 detects an error, the error is recorded in a supervisory error counter by block 108 and the error inhibit is set by the block 92. Box 110 places a supervisory control on train operation, i.e. a predetermined count limit is placed on errors and, if the supervisory count is exceeded, the block 94 places the supervisor inhibit on control system operation and the ability of the operator to reset the control.

Generally, the supervisory count system can have various forms. For example, all errors may be classed alike and a single count limit is then applied to a single accumulation of all errors. Alternately, two or more classes of errors can be tracked and each error class can have an independent error count limit. Among other possibilities, the two examples just noted can be combined so that exceeding either the single error limit or any error class limit will cause a supervisor inhibit. The preferred supervisory count system is described more fully subsequently herein.

After the supervisory monitoring routine has been executed, block 112 puts the control in a safe nonoperating condition, i.e. essentially deenergization of the traction motors in the car where the error has been detected. The program then cycles to the program start and loops through the inhibit checks as previously described.

When the box 106 detects no error, block 114 executes good behavior routines which determine whether the control has operated since the last error to merit a good behavior credit in accordance with predetermined criteria. If a good behavior credit has been earned as detected by box 116, the supervisory counter 108 is reduced by block 118 and the removed error is recorded in an error history register (not specifically illustrated). After the good behavior check, the program cycles back to the beginning.

FAULT AND OPERATING ERROR ROUTINES

A nonserious failure or error is called an OPERATIONAL ERROR which means the sensed state of a controlled device does not agree with the commanded state. State errors can be detected because the control computer has control of each device and also has feedback on the device state. OPERATIONAL ERROR detection is completely independent of contrl logic which directs the normal opening and closing of controlled devices.

Figure 5A:
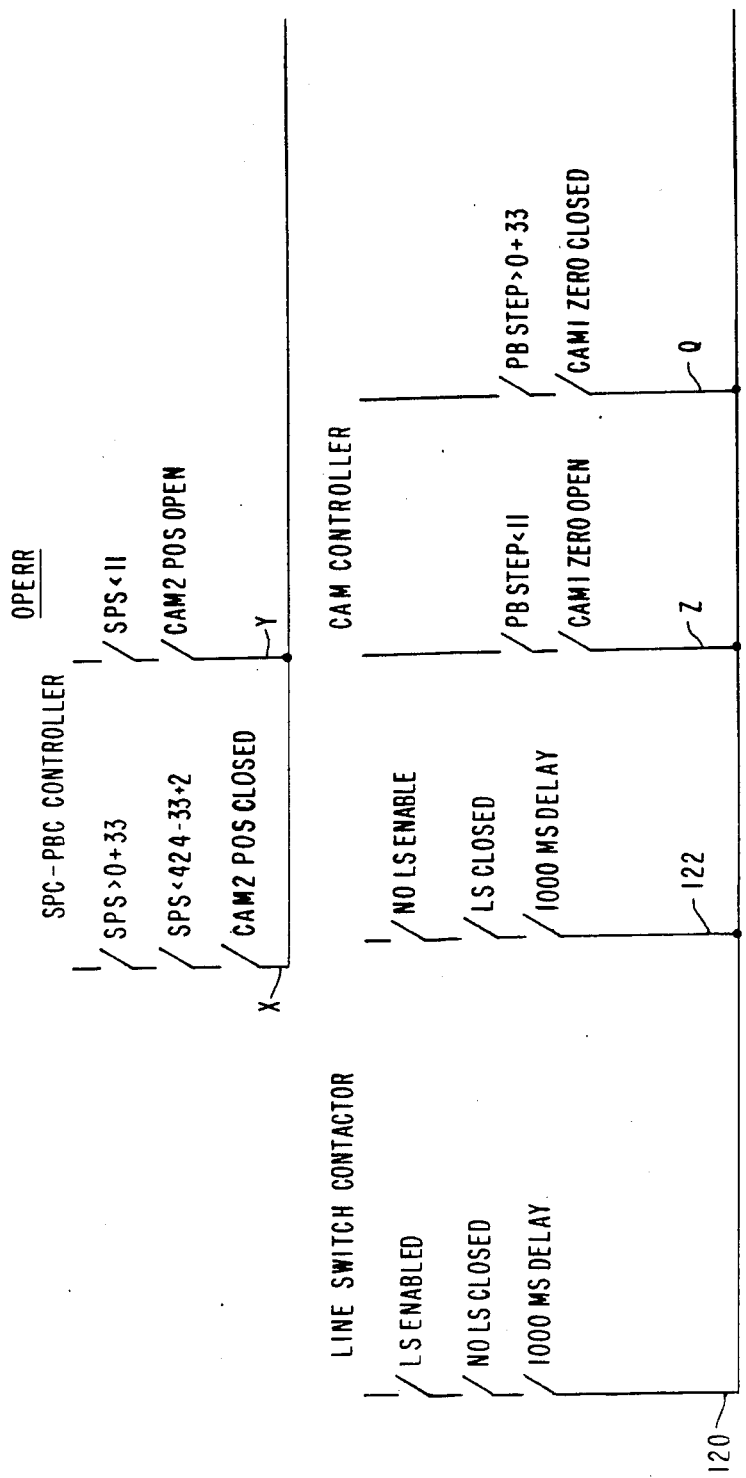
FIGS. 5A-5B and 6 show respective logic diagrams for error routines employed in the monitor program of FIG. 4.
Figure 5B:
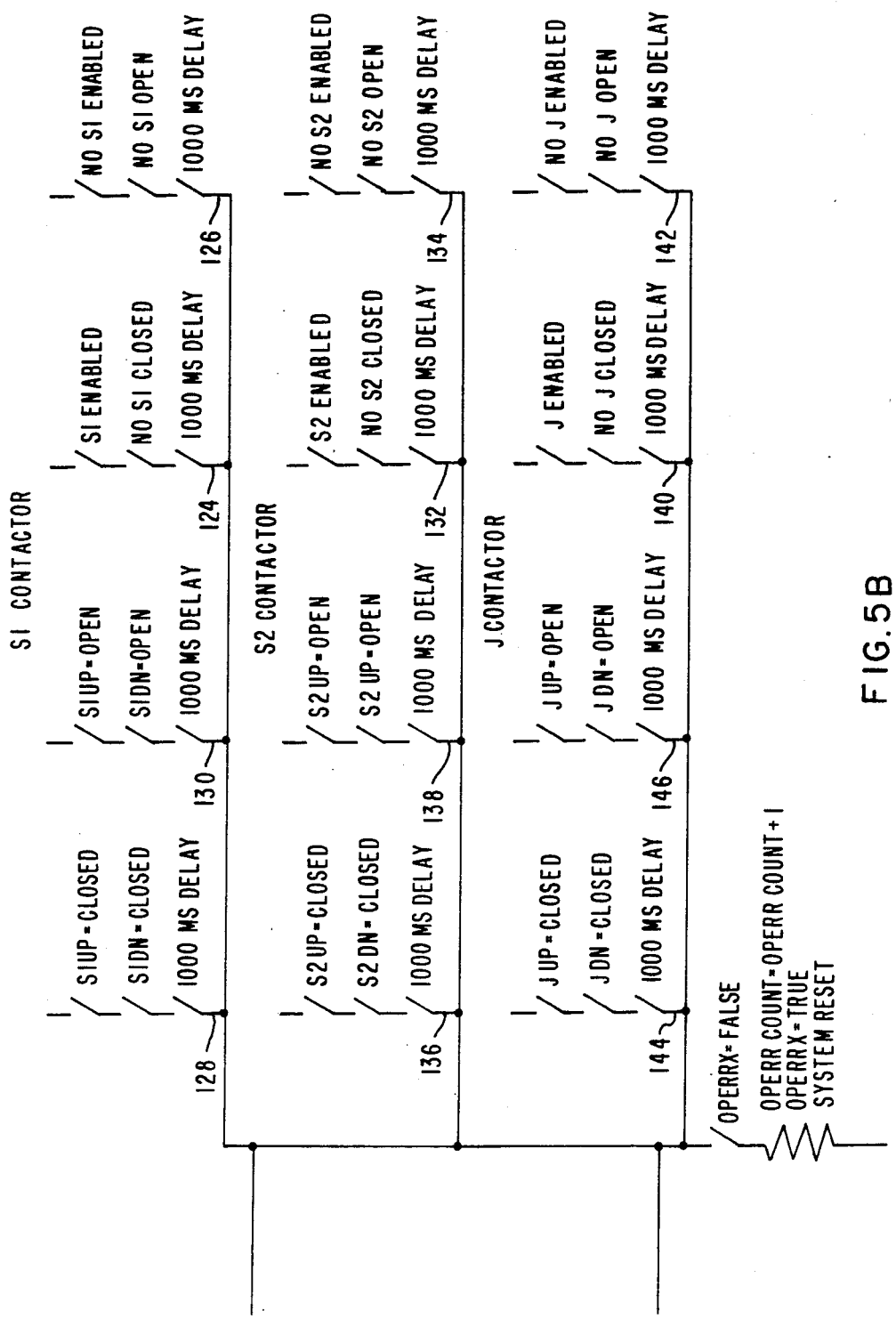

OPERATIONAL ERRORS implemented in the control 40 includes (see FIGS. 5A-B for logic diagrams):

S1 Contactor closed when it should be open—124
S1 Contactor open when it should be closed—126
S1 Open Sensor & S1 Closed Sensor both true—128
S1 Open Sensor & S1 Closed Sensor both false—130

S2 Contactor closed when it should be open—132
S2 Contactor open when it should be closed—134
S2 Open Sensor & S2 Closed Sensor both true—136
S2 Open Sensor & S2 Closed Sensor both false—138

J Contactor closed when it should be open—140
J Contactor open when it should be closed—142
J Open Sensor & J Closed Sensor both true—144
J Open Sensor & J Closed Sensor both false—146

Line Switch closed when it should be open—122
Line Switch open when it should be closed—120

Figure 6:
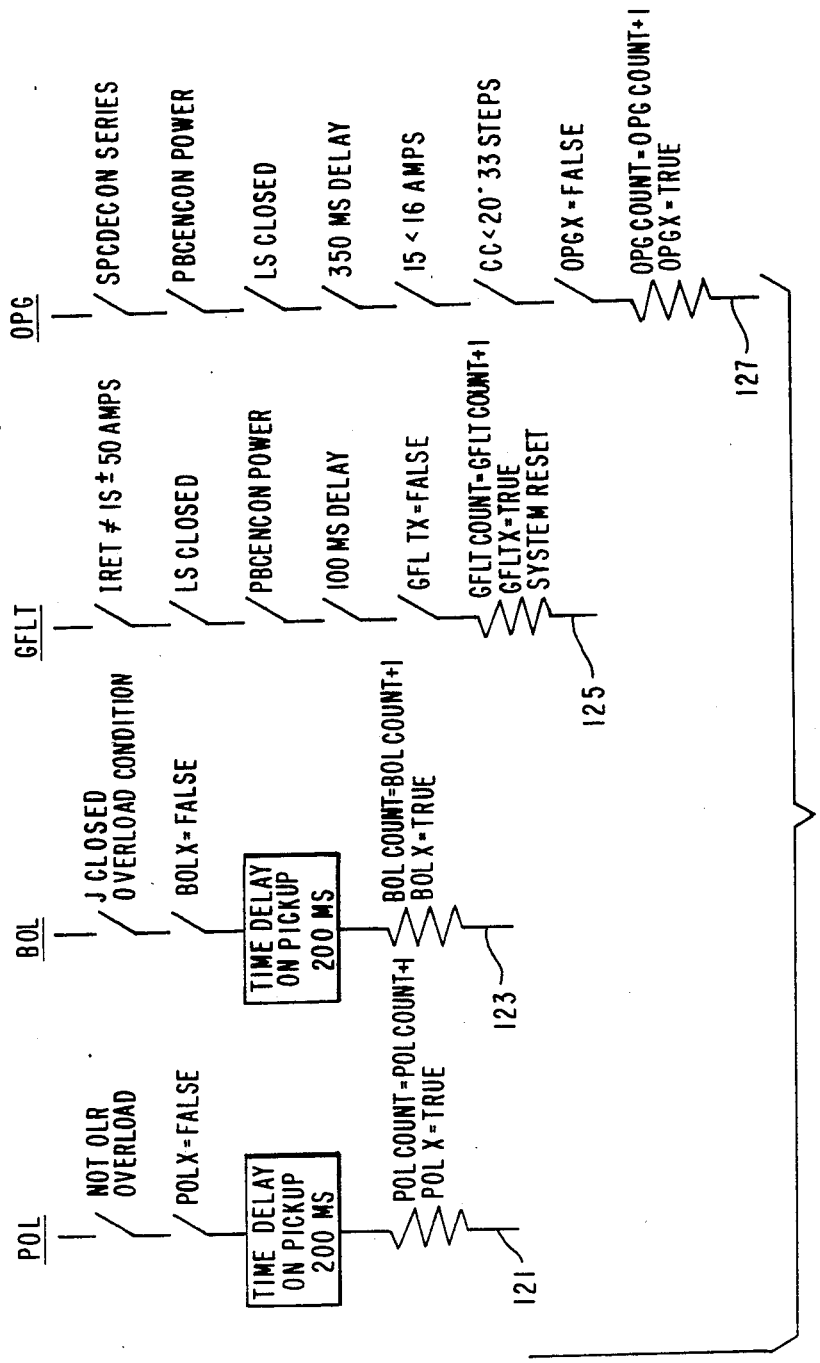

SPC/PBC Position Sensor true when it should be false—X
SPC/PCB Position Sensor false when it should be true—Y Cam Position Sensor true when it should be false—Q
Cam Position Sensor false when it should be true—Z Serious failures or errors are called FAULTS (see FIG. 6) and preferably are defined to include power overloads (excess acceleration current) 121, brake overloads (excess brake current) 123, ground faults (current into CCP does not equal current exiting CCP) 125 and open power grids 127.

FAULT AND OPERATIONAL ERROR DETECTION—MORE DETAIL

There are a total of five types of failures that are detected and four of these are FAULTS. When FAULTS occur, the propulsion system is put into a safe mode of operation and further operation is prevented until the operator resets the FAULT using the trainline 61. The supervisor feature allows FAULTS to be reset only four times. The fifth FAULT disables further operation of the propulsion unit until a maintenance technician repairs whatever caused the FAULT and resets the supervisor using the supervisor reset button 63 (FIG. 2) located in the car control package 22 (FIG. 1). Similarly, the supervisor feature allows OPERATIONAL ERRORS to be reset only eight times with car disablement occurring on the ninth.

The type and number of failures (FAULTS or OPERATIONAL ERRORS) are stored by the microcomputer using battery backed-up memory so the information is available for later troubleshooting, even if car battery voltage is removed from the microcomputer. Access to failure information is available by plugging the diagnostic terminal into the microcomputer located inside each car control package (CCP) 22.

The following provides additional description oft the four failures (FAULTS) in the serious category and fifteen errors (OPERATIONAL ERRORS) in the nonserious category:

A. POWER OVERLOAD FAULT

The power Overload Relay (OLR) is an integral part of the Line Switch (LS). When an excessive current flows through the OLR coil the relay will close. As the relay armature closes, it physically pulls the LS contacts open, deenergizes the LS coil through OLR interlocks, and becomes latched in the closed position. The microcomputer senses operation of the Overload Relay.

B. BRAKE OVERLOAD FAULT

The brake overload protection is somewhat different from power. Excessive current through the series coil of the J contactor closes J. Closing J during braking forces current through the traction motor fields in the direction opposite to their normal brake current direction and thus kills the braking current. The closing of J by the series coil is used to indicate a brake current overload condition by the microcomputer.

C. OPEN POWER GRID FAULT

At the start of each power application from zero speed, the integrity of the power resistor grid is checked. The microcomputer does this by verifying that current builds up immediately after the Line Switch closes. The lack of current build-up means that an open circuit exists, most likely due to an open power resistor or cable.

D. GROUND FAULT

Any time the propulsion is in power, the microcomputer compares the current flowing through the Line Switch (TD1) with the current flowing from the ground return lead (TD3). If the two currents differ by more than a predetermined amount such as 50 amperes for more than a predetermined time such as 100 milliseconds, a ground fault event is detected.

E. OPERATIONAL ERRORS

Whenever the propulsion system is in normal operation, the microcomputer monitors the actions of the power carrying devices including the Line Switch, S1, S2 and J contactors, SPC/PBC and Cam Controllers. When a device is commanded to move, the microcomputer checks that the move is completed within an allotted time. Failures or partial failures of devices are thus detected before further damage is done.

When any one of these conditions is sensed, propulsion system is placed in a safe nonoperating status which typically includes:

Open Line Switch to remove high voltage
Close J to remove any brake current
Turn SPC/PBC to OFF to open power and brake circuits
Turn cam controller to OFF.

SUPERVISORY ROUTINES

Figure 7:
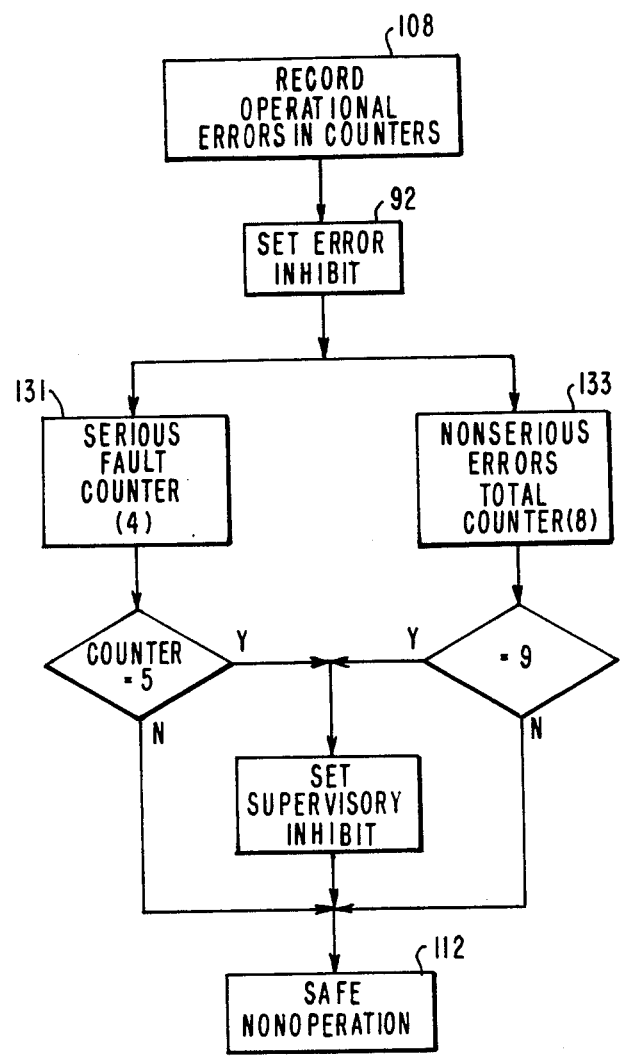
FIG. 7 shows a flow chart for supervisory routines employed in the monitor program of FIG. 4.

The software supervisory routines keep track of detected errors to enable system safety and maintenance to be enhanced without unnecessary system outages. The supervisory control limits the number of times errors can be reset by the operator before the individual car propulsion system is taken off line for supervisor action (i.e. supervisor reset or maintenance scheduling). As previously indicated, each error can have its own limit or a grand total error limit may be employed. In the present embodiment, each serious error is preferably tracked as a separate error class or group and nonserious errors are preferably tracked together as a separate error class (see FIG. 7). The count limit in counter box 131 for each serious error is 4 and the count limit in counter 133 for nonserious errors is 8 in the present embodiment. If any counter exceeds its limit, propulsion control is latched out.

GOOD BEHAVIOR

Various nuisance errors can occur as a result of special circumstances, for example, power or brake overloads can result from wheel slippage on wet rail or from intermittent wiring problems. It is thus desirable to distinguish a true problem in which the propulsion unit should be removed from further service versus a nuisance problem which does not warrant a car or train outage. GOOD BEHAVIOR is the basis on which a distinction is made in the present invention and it occurs after the propulsion system performs a complete power and brake cycle following an operator reset without another fault event. GOOD BEHAVIOR could be one or any required number of such successful power/brake cycles, or other similar and appropriate criteria can be employed for GOOD BEHAVIOR. After GOOD BEHAVIOR occurs, the supervisory counters are adjusted to reflect that the propulsion system is operating properly. Any real problem would repeatedly show up before GOOD BEHAVIOR would occur. It is preferred that the operational error count be reduced by one every time GOOD BEHAVIOR is exhibited.

Fault or error counts which have been removed are transferred into a permanent HISTORY RECORD. A car unit's history accumulates all the unit fault indications as they are removed from the supervisory counter by GOOD BEHAVIOR, or by supervisory reset. The history gives a permanent record of what has happened to the propulsion unit and can be used for maintenance review and planning and for the making of equipment repair decisions. This information is valuable in determining long term problems with the equipment or with the design itself.

Figure 8:
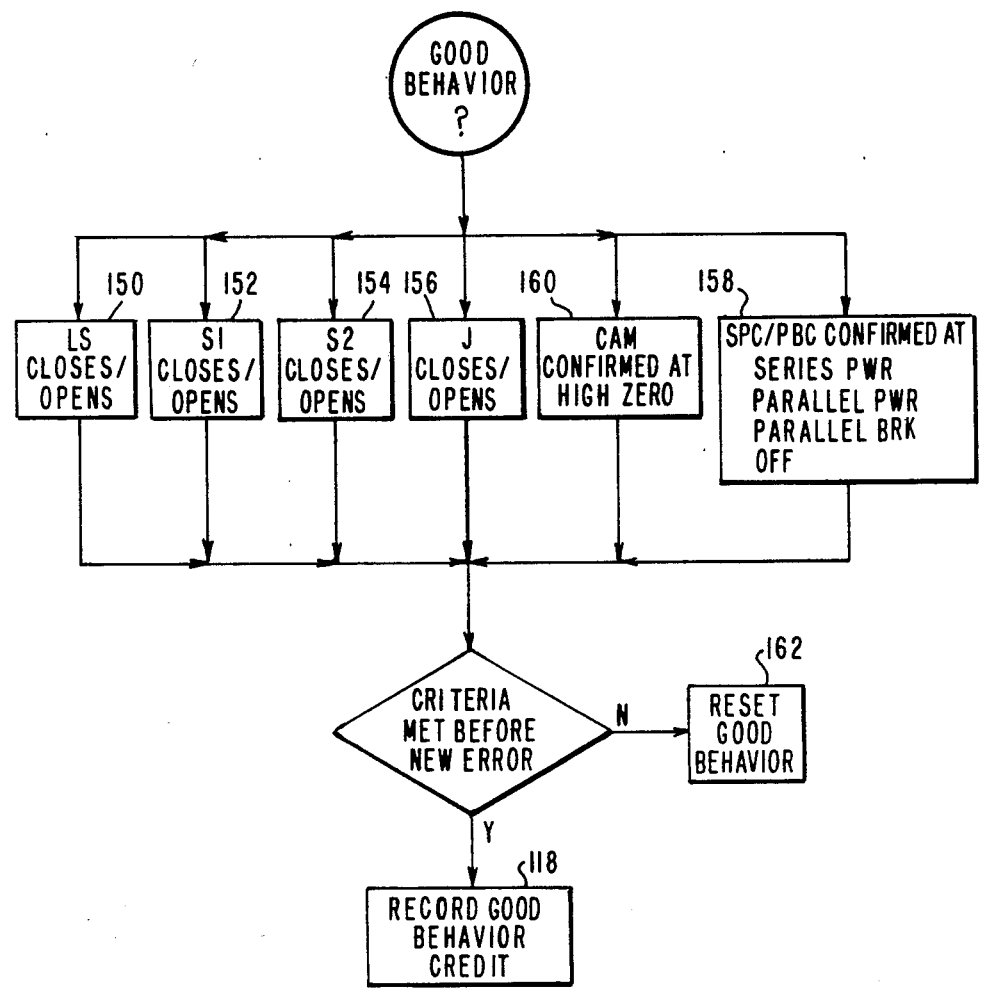
FIG. 8 shows a logic/flow diagram for good behavior routines employed in the monitor program of FIG. 4.

The criteria 150-160 employed to determine whether a GOOD BEHAVIOR credit has been earned are shown in the logic/flow chart of FIG. 8. The criteria include the closing and opening of the line switch and the contactors, SPC/PBC controller operation in each of the two modes of power operation and each of the two modes of braking operation, and CAM operation at the high and zero positions. When it is detected that all criteria have been satisfied since the last error, a power/brake cycle is indicated as having been completed. Since the cycle has been completed with GOOD BEHAVIOR, the block 118 records a GOOD BEHAVIOR credit. If an error occurs before a GOOD BEHAVIOR credit is earned, block 162 resets the GOOD BEHAVIOR boxes 150-160 and a new GOOD BEHAVIOR measurement is begun.

APPENDIX

This advanced cam propulsion system is all electric, and its control is almost totally provided by the micro-controller Logic. It is used with four series motors and covers both acceleration and dynamic braking of a multiple unit train.

The principal pieces of control apparatus are housed in a single packaged unit (see FIG. 1—1) and include the Reverser, Line Switch, Cam Controller, Series Parallel/Power Brake Controller, power contactors, micro-controller Logic, solid state current and position sensors. These devices are similar in varying degrees to corresponding original R36 devices, but have unique differences.

1.1 EQUIPMENT DESCRIPTIONS

A. Reverser

This device uses 8 cam switches to achieve motor reversing. The cam shaft is rotated by a permanent magnet dc gear motor. The cam shaft rotates in only one direction; motor reversing occurs every half turn.

B. Line Switch

This device is electrically operated, but otherwise functions the same as the original R36 line switch.

C. Cam Controller

The cam switch and cam arrangement are identical to the original R36 controller. The air motor has been replaced with an electric motor, and all but one of the cam position interlocks have been replaced by a single non-contact solid state position sensor.

D. SPC/PBC Controller

This device make the series-to-parallel and power-to-brake motor circuit connections. Like the Cam Controller, it has cam operated switches driven by an electric motor. This one device replaces previously independent SPC and PBC devices. The cam development and the four stopping positions of this device are referred to as mode 0, 1, 2 and 3 throughout the rest of this description.

Mode 0 Series-brake (off position)
Mode 3 Parallel-brake (brake or coast)
Mode 2 Parallel-power (parallel)
Mode 1 Series-power (switch and series)

The device is spring returned to mode 0 in the event of control power or Logic failure. A solenoid latch is used to cage the spring during normal operation.

A non-contact solid state position sensor is used with the SPC/PBC, replacing previously used interlocks.

E. Power Contactors

Contactors used for S1, S2 and J are the same as used on the original R36 equipment. Each contactor uses two non-contact position sensors to indicate pulled in and dropped out conditions.

F. Logic

The Logic is a digital microprocessor controller. It consists of four removable PC boards housed in a cradle. This device is the operating heart of the Electric Cam, providing almost all of its control and diagnostic capabilities.

G. Current Transducer

Three Hall Effect transducers are used to sense currents; one in the line feed, one in the ground return and one in the brake loop.

H. Position Sensor

These devices are small, solid state metal detectors. They sense the presence or absence of a bolt head target and are used on all the power devices to determine position.

1.2 OPERATION

In acceleration, the four motors are connected in series, with all resistance inserted for starting and running to series full field. At series full field, bridge transition occurs, leaving the motors connected in two groups of 2 motors in parallel. The final acceleration connection leaves each motor at half line voltage with its field shunted.

The motors are reconnected for dynamic braking, with the pair of motor armatures from one truck feeding the fields of the motors from the other truck.

The equipment is suitable for operation in trains containing 2 to 10 cars. Although several cars may be connected together in a train, only one Master Controller will be selected to run the train. The other Master Controllers will be left in the off or non-operating position.

Although the Master Controller is not part of this Electric Cam equipment, the Electric Cam has been designed to work with the existing R36 Master Controller, including the local/express, energy saver modification. This equipment responds to the following Master Controller positions and trainline signals:

1.
Direction Controller
Forward TL-1 Energized after a power position.
Reverse TL-2 Selected.
2.
Power Controller
1 (Switching) TL-GS
2 (Series) TL-4
3 (Parallel) TL-7
Energy Saver (Local) TL-6
3.
Brake Controller
Brake Request TL-5
Variable Pressure to 70 psi.

The Master Controller, through the trainline wires, provides the same control energy simultaneously on all cars. For this reason, the remainder of this explanation will focus on the operation of a single car.

NOTE

In describing the normal operation of this control, only the observable results of the Logic's actions are discussed. A detail disclosure of all the Logic software actions is beyond the intent of this document.

A. Master Controller OFF Position

In this position, even though no trainline wires are energized, some main switches will be closed. in the mode O "off" position of the SPC/PBC, the JR, B, B9 and B10 switches are closed. In addition, R1, R4 and several B switches on the cam controller (CC) are closed in its "off" position. However, the Line Switch (LS) and SPC/PBC switches M, G, G1 and G11 will be open, thus preventing either power or dynamic brake circuits from being completed.

Coasting, which also occurs with the master controller in the off position, will be described later.

B. Master Controller, No. 1 Position

If the train is completely made up and ready for operation, movement of the Master Controller to position No. 1 energizes the GS wire and the 1 or 2 wire, depending upon the direction of train movement selected by the operator. The following sequence of events occurs:

1. The Reverser moves to the position selected by the operator or, if the Reverser handle has not been moved, remains in its original position.

If the Reverser is not in the position requested, the selected trainline energizes the FD or RD relay. Either of these relays applies CB+ through fuse F2 and Line Switch interlock to the Reverser motor M1. The Reverser motor advances the Reverser cam shaft approximately 180 degrees until Reverser interlocks are actuated, dropping FD or RD relay and stopping the Reverser motor. The Reverser cannot change positions unless the Line Switch is open.

When the Reverser position matches the trainline request, the Reverser interlocks provide a feed to the Confirmed Direction Relay (CD).

2. When the Reverser is in the requested direction, GS and CD signals are available to the Logic. Battery energy is available to the Line Switch through CD, OLR and ER contacts, but Solid State Relay 13 (SSR13) is not yet enabled.

The SPC/PBC moves from mode 0 to mode 1. In this position, B, B9 and B10 switches are open and G1 and G11 are closed. J closes during a part of SPC/PBC's travel from mode 0 to mode 1.

3. After SPC/PBC mode 1 position is confirmed, SSR13 is enabled, causing the Line Switch to close.

4. Closing LS establishes the "switching" configuration and power is applied from the third rail through LS, 2 and 1 motors to J, through R1 switch, through resistance R1-JR, through JR switch, through resistor M-R4, R4 switch, 4 and 3 motors, G1 and G11 switches to ground. This connection is four motors in series with maximum resistance and as the name implies is a low speed connection.

C. Master Controller, Position No. 2 Series

Advancing the Master Controller to the No. 2 position energizes the #4 wire and allows the control to further advance in the following sequence:

1. S1 contactor closes, shorting out resistance R3-JR.
2. S2 contactor closes, shorting out resistance M-R6.
3. The Cam Controller advances in response to the current request, closing various R switches, until R1-R3 and almost all of R4-R6 resistances are shorted out.
4. Under current control, the J contactor closes, shorting out the last resistance and leaving the four traction motors in the series full field configuration.
5. The Cam Controller continues to advance to CC-6, opening some of the R switches to prepare for transition to parallel.

D. Master Controller, Position No. 2 Delayed Transition

If the Master Controller is kept in the No. 2 position after the control has reached series full field, delayed transition action occurs. When the motor current reduces to the delayed transition setting, and the Cam Controller runs to position CC-8, where S1 and S2 open.

The purpose of this is to position the Cam Controller, which is used in both power and brake to prepare for the next application of additional power (No. 3 Master Controller position) or brake.

E. Master Controller Position No. 3 Parallel

Advancing the Master Controller to the No. 3 position energizes the #7 wire and allows the control to further advance in the following sequence:

1. The SPC/PBC moves from mode 1 to mode 2, opening JR and closing M and G.
2. The J contactor drops out, leaving the equipment in parallel configuration, with maximum resistance in series with each pair of motors.
3. The Cam Controller advances in response to the current request, closing various R switches until the R1-R3 and R4-R6 resistances are shorted out at CC-12 and the motors are in the parallel full field configuration.

If the "local" mode has been selected by the operator, TL-6 will be energized and the Cam Controller will stop at this position.

4. If the "express" mode has been selected by the operator, TL-6 will not be energized, and the Cam Controller will continue to advance closing the field shunt switches until it reaches cam position CC-16 where the motors operate in the maximum field shunting configuration.

F. Master Controller, OFF Position Coasting

When the master controller is returned to the OFF position after the control has advanced as previously described, the coast circuit is set up. Actually, the coasting and braking circuits are identical. The value of the current request is the only difference.

When the Master Controller is returned to the off position, trainlines 1, or 2, 4, 7 and GS are deenergized, and the following sequence of operation occurs:

1. Line switch is dropped.
2. S1 and S2 drop.
3. SPC/PBC moves from mode 2 (or mode 1 if control was only in series) to mode 3, opening G1 and G11 and closing B, B9 and B10.

The main motor braking circuits are now setup, and the Cam Controller will operate in the braking direction closing various B switches in response to the coast current request and cutting out resistance a it travels to the off position.

G. Braking

When the Master Controller is in the OFF position and the brake handle is moved to the SERVICE BRAKE position, TL-5 becomes energized. TL-5 in turn energizes the BR relay and is a signal to the Logic to increase the brake current request to a value defined by the brake pressure line. This pressure is sensed by pressure transducer TD4.

The main motor circuit is the same in brake and coast.

H. Brake to Coast

When the brake valve handle is moved from a service position to OFF while brake current is flowing, the Cam Controller will react to insert resistance into the braking circuit and thus reduce the braking current to a coasting value. This is called "repositioning", and the following sequence occurs:

1. J closes, killing brake current to a very low value.
2. Cam Controller moves back three positions, inserting resistance.
3. J opens, allowing coast current to establish.

Repositioning will occur any time the motor brake current exceeds the reposition value while in coast.

I. Line Relay Protection

For normal operation of the car during acceleration, the Line Relay (LR) must be closed. Its operating coil is connected to the third rail power source and will be deenergized when the third rail power is lost.

If the control has advanced in power, loss of the Line Relay causes the following sequence to occur:

1. Line Switch drops.
2. S1 and S2 drop.
3. SPC/PBC moves from mode 1 or 2 to mode 3, setting up the coast configuration.

When power returns to the third rail, control is resumed only after the Line Switch is confirmed open and SPC/PBC mode 3 is confirmed. Thus when power returns, normal reapplication of power from coast occurs.

A low voltage tap is brought out of the line relay coil to allow pickup of the relay with battery voltage for sequence test.

J. Brake To Brake

When the brake controller is moved to OFF and a power position is selected, the following sequence occurs:

1. J closes, killing any brake motor current.
2. Cam Controller moves back three positions (same as brake to coast reposition).
3. SPC/PBC moves from mode 3 to mode 1.
4. J opens, leaving motor circuit in series connection.
5. Line Switch closes, applying power.
6. S1 and S2 close in sequence.
7. Control advances including cam motion and parallel transition, if required, in response to Master Controller power position and cam position when brake to power occurred.

What is claimed is:

1. A control and monitoring system for a train having a plurality of cars each having a propulsion system, said control and monitoring system comprising:

a propulsion control for operating each car propulsion system;

said control including digital computer means for responding to a plurality of input signals from said control and monitoring system and generating control outputs for operating controlled devices of the associated car propulsion system;

said digital computer means detecting errors between commanded and actual operation conditions for preselected controlled devices or system parameters;

said digital computer means deactivating the associated propulsion system for any car in which an operating error has been detected;

operator control means for resetting any deactivated propulsion control to reactivate the associated propulsion system;

said digital computer means disabling said operator resetting control means for the deactivated propulsion control under predetermined error conditions;

supervisor control means for resetting any propulsion control deactivated by said operator reset disabling means thereby enabling the associated car propulsion system to be reactivated for supervised car operation or maintenance; and means for recording error data for historic purposes under predetermined conditions.

2. A train control and monitoring system as set forth in claim 1 wherein:

said operator reset disabling means disables said operator resetting means if a predetermined grand total number of different types of operating errors are detected.

3. A train control and monitoring system as set forth in claim 1 wherein:

said operator reset disabling means disables said operator resetting means if a predetermined number of errors of any one type of error included in a preselected group of error types are detected.

4. A train control and monitoring system as set forth in claim 3 wherein:

said operator reset disabling means further disables said operator resetting means if a predetermined number of different types of operating errors are detected.

5. A train control and monitoring system as set forth in claim 3 wherein:

errors are classified into a group of serious errors or faults and a group of nonserious errors and said operator reset disabling means disables said operator resetting means if a first number of faults has been detected or if a second number of nonserious errors different from said first number has been detected.

6. A train control and monitoring system as set forth in claim 5 wherein:

the faults include one or more selected from power overload, brake overload, ground fault and open power grid.

7. A train control and monitoring system as set forth in claim 6 wherein:

the nonserious errors include one or more error conditions associated with one or more controlled devices in said propulsion control selected from a group including a line switch contactor, a cam controller, a series parallel/power brake controller, and power contactors.

8. A train control and monitoring system as set forth in claim 7 wherein:

the faults include one or more selected from power overload, brake overload, ground fault and open power grid and the nonserious errors include one or more error conditions associated with one or more controlled devices in said propulsion control selected from a group including a line switch contactor, a cam controller, a series parallel/power brake controller, and power contactors.

9. A train control and monitoring system as set forth in claim 3 wherein:

the types of errors include one or more selected from power overload, brake overload, ground fault and open power grid.

10. A train control and monitoring system as set forth in claim 1 wherein:

said digital computer means determines when preestablished car operating criteria have been met after an error has occurred for a particular car to credit that car with good behavior in its operation under said control and monitoring system; and said digital computer means modifying the operation of said operator reset disabling means for each car so as to reflect good behavior credits for each car.

11. A train control and monitoring system as set forth in claim 10 wherein:

said operator reset disabling means disables said operator reset means if a predetermined grand total number of different types of operating errors are detected; and each good behavior credit decrements the grand total error count.

12. A train control and monitoring system as set forth in claim 11 wherein:

the criteria for good behavior credit are selected to represent operation of the associated car through a complete power/brake cycle without any detected errors in the operation of that car.

13. A train control and monitoring system as set forth in claim 10 wherein:

said operator reset disabling means disables said operator reset means if a predetermined number of errors of any one type of error included in a preselected group of error types are detected; and each good behavior credit decrements the error count for each type of error.

14. A train control and monitoring system as set forth in claim 10 wherein:

errors are classified into a group of serious errors or faults and a group of nonserious errors and said operator reset disabling means disables said operator reset means if a first number of faults has been detected or if a second number of nonserious errors different from said first number has been detected; and each good behavior credit decrements the error count for nonserious errors.

15. A train control and monitoring system as set forth in claim 14 wherein:

the criteria for good behavior credit are selected to represent operation of the associated car through a complete power/brake cycle without any detected errors in the operation of that car.

16. A train control end monitoring system as set forth in claim 15 wherein:

the good behavior criteria include (a) opening and closing of controlled devices in said propulsion control including a line switch and a plurality of power contactors, (b) confirming series parallel/power brake controller operation at series power, parallel power, parallel brake, and OFF, and (c) confirming cam controller operation at high and low positions.

17. A train control and monitoring system as set forth in claim 10 wherein:

the criteria for good behavior credit are selected to represent operation of the associated car through a complete power/brake cycle without any detected errors in the operation of that car.

18. A train control and monitoring system as set forth in claim 17 wherein:

the good behavior criteria include (a) opening and closing of controlled devices in said propulsion control including a line switch and a plurality of power contactors, (b) confirming series parallel/power brake controller operation at series power, parallel power, parallel brake, and OFF, and (c)

confirming cam controller operation at high and low positions.

19. A control and monitoring system for a car in a train having a plurality of cars each having a propulsion system, said car control and monitoring system comprising:
- a propulsion control for operating the car propulsion system;
- said control including digital computer means for responding to a plurality of input signals from said control and monitoring system and generating control outputs for operating controlled devices and said car propulsion system;
- said digital computer means detecting errors between commanded and actual operating conditions for preselected controlled devices or system parameters;
- said digital computer means deactivating said car propulsion system if a car operating error has been detected;
- operator control means for resetting said propulsion control when it is deactivated to reactivate the propulsion system;
- said digital computer means disabling said operator resetting control means for said propulsion control under predetermined error conditions; and
- supervisor control means for resetting said propulsion control when it is deactivated by said operator reset disabling means thereby enabling said propulsion system to be reactivated for supervised car operation or maintenance.

20. A car control and monitoring system as set forth in claim 19 wherein:
- said operator reset disabling means disables said operator resetting means if a predetermined grand total number of different types of operating errors are detected.

21. A car control and monitoring system as set forth in claim 19 wherein:
- said operator reset disabling means disables said operator resetting means if a predetermined number of errors of any one type of error included in a preselected group of error types are detected.

22. A car control and monitoring system as set forth in claim 19 wherein:
- errors are classified into a group of serious errors of faults and a group of nonserious errors and said operator reset disabling means disables said operator resetting means if a first number of faults has been detected or if a second number of nonserious errors higher than said first number has been detected.

23. A car control and monitoring system as set forth in claim 19 wherein:
- said digital computer means determines when preestablished car operating criteria have been met after an error has occurred for a particular car to credit that car with good behavior in its operation under said control and monitoring system; and
- said digital computer means modifying the operation of said operator reset disabling means for said car so as to reflect good behavior credits for said car.

24. A car control and monitoring system as set forth in claim 23 wherein:
- errors are classified into a group of serious errors or faults and a group of nonserious errors and said operator reset disabling means disables said operator resetting means if a first number of faults has been detected or if a second number of nonserious errors different from said first number has been detected; and
- each good behavior credit decrements the error count for nonserious errors.

25. A car control and monitoring system as set forth in claim 23 wherein:
- the criteria for good behavior credit are selected to represent operation of said car through a complete power/brake cycle without any detected errors in the operation of said car.

* * * * *